United States Patent [19]

Engström et al.

[11] Patent Number: 4,616,576

[45] Date of Patent: Oct. 14, 1986

[54] COMBUSTION METHOD

[75] Inventors: Folke Engström, Karhula; Bertel K. Hakulin, Helsinki; Seppo K. Ruottu, Karhula, all of Finland

[73] Assignee: A. Ahlstrom Corporation, Noormarku, Finland

[21] Appl. No.: 739,005

[22] Filed: May 29, 1985

[30] Foreign Application Priority Data

Jun. 1, 1984 [FI] Finland .................. 842201

[51] Int. Cl.⁴ .................. F23G 5/00; F22B 1/00
[52] U.S. Cl. .................. 110/345; 110/347; 110/245; 432/58
[58] Field of Search .................. 110/345, 245, 347; 432/58, 15

[56] References Cited

U.S. PATENT DOCUMENTS

| | | | |
|---|---|---|---|
| 3,366,080 | 1/1968 | Albertson | 110/245 |
| 3,888,193 | 6/1975 | Kishigami et al. | 110/245 |
| 4,159,682 | 7/1979 | Fitch et al. | 110/245 |
| 4,324,544 | 4/1982 | Blake | 110/347 |
| 4,355,601 | 10/1982 | Hattiangadi | 110/245 |
| 4,416,418 | 11/1983 | Goodstine et al. | 110/245 |
| 4,434,726 | 3/1984 | Jones | 110/245 |
| 4,446,799 | 5/1984 | Andersen | 110/245 |

FOREIGN PATENT DOCUMENTS 2945544  4/1982  Fed. Rep. of Germany.

Primary Examiner—Henry C. Yuen
Attorney, Agent, or Firm—Nixon & Vanderhye

[57] ABSTRACT

In a two-stage combustion method first and second circulating fluidizing bed systems are utilized. The first bed system is operated under reducing (sub-stoichiometric) conditions so as to minimize $NO_x$ formation. Solids in the flue gases are separated and returned to the first bed system, while the flue gases are subjected to afterburning in the second bed system. Oxygen containing gas is supplied to the second bed system to effect afterburning, and additionally sulfur absorbing and/or $NO_x$ formation decreasing agents are supplied to the second system. When burning coal, the first system is operated at a temperature of about 700°–1000° C., while the second system is operated at about 600°–950° C. The flue gases may be cooled, just prior to effecting separation of the solids, in one or both of the bed systems.

12 Claims, 1 Drawing Figure

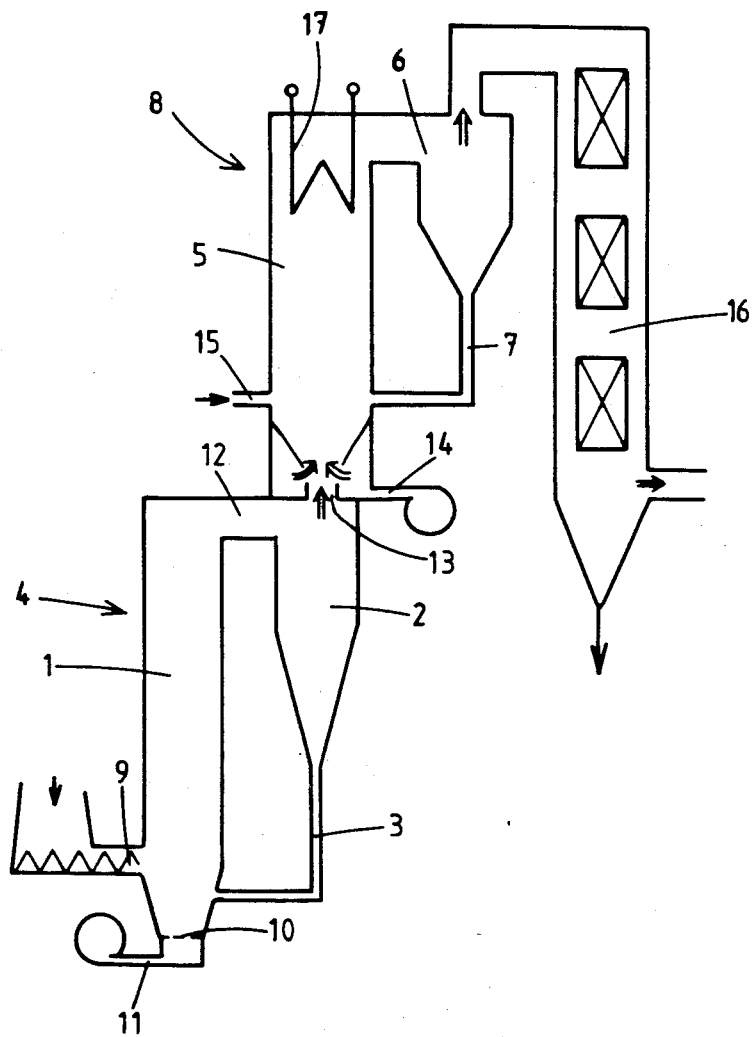

COMBUSTION METHOD

TECHNICAL FIELD

The present invention relates to a two-staged combustion method based on fluidized bed technique, the method being in particular intended for the combustion of sulfur containing fuels such as coal.

OBJECT OF THE INVENTION

The object of the invention is to provide an efficient combustion method, with minimal amounts of $SO_2$ and $NO_x$ in the flue gases, and a method which can easily be adapted to varying combustion requirements and to fuels having different heat values.

SUMMARY OF THE INVENTION

It is a characteristic feature of the combustion method according to the invention that the fuel is supplied into a first circulating bed system operating under reducing conditions in which solids contained in the flue gases discharged from the reactor are separated and recycled into the reactor; and that the gases are introduced into a second circulating bed system, into the reactor of which gas containing oxygen is supplied.

BRIEF DESCRIPTION OF THE DRAWING

The invention is described in detail with reference to the enclosed drawing which illustrates schematically an exemplary apparatus for practicing the method according to the invention.

SPECIFIC DESCRIPTION

In the exemplary apparatus illustrated in the drawing, a reactor 1, a cyclone separator 2 and a separated-solids return conduit 3 constitute a first calculating bed system 4; and a reactor 5, a cyclone separator 6 and a separated solids return conduit 7 constitute a second circulating bed system 8. Coal, or a like fuel, is supplied into the lower portion of the reactor 1 through a feed line 9 above a grid 10. The primary air for the combustion process is introduced through a duct 11. Solid material is separated from the gases discharged through a duct 12 from the top portion of the reactor in the separator 2, and the separated solids are recycled to the lower portion of the reactor through conduit 3. The exhaust gases are guided through a duct 13 to the lower portion of the reacto 5 in the second circulating system 8, and secondary air is injected through a duct 14.

In the first reactor 1, the amount of oxygen introduced through duct 11 is controlled so that combustion takes place under sub-stoichiometric (reducing) conditions so as to minimize $NO_x$ formation.

In the second reactor 5, afterburning of the exhaust gases from the first reactor 1 is practiced.

Also an agent absorbing sulfur, e.g. lime, or a material for decreasing $NO_x$ formation, e.g. ammonia, can be fed into the reactor 5 through a duct 15. The circulating fluidized bed technique provides for good sulfur absorbtion. The discharge gases are guided through separator 6, in which the solids to be recycled to the reactor are removed, to a conventional device 16 in which the heat contained in the gases is recovered. Heat is also recovered by cooling pipes 17 disposed in the reactor. The combustion chamber of the first reactor 1, too, can be equipped with cooling pipes, which perform a cooling function.

When burning coal, the combustion process is controlled so that the temperature in the first reactor 5 it is is 700° to 1000° C. and in the second reactor 5 it is 600° to 950° C. This is accomplished by controlling the amount of fuel and oxygen to each of the reactors 1, 5.

The invention is not limited to the embodiment presented as an example, only, but various modifications may be made of it within the scope of protection defined by the appended claims.

What is claimed is:

1. A two-stage combustion method utilizing first and second circulating fluidizing bed systems, comprising the steps of:
   supplying fuel to the first circulating fluidizing bed system, the fuel remaining fluidized during combustion thereof;
   operating the first system under reducing conditions to produce flue gases with combustible solids therein;
   separating the solids from the flue gases of the first system, recirculating the separated solids to the first system;
   introducing the flue gases, after separation of solids therefrom, from the first system into the second circulating fluidizing bed system;
   introducing oxygen containing gas into the second system to effect afterburning of the flue gases from the first system, and wherein in the second circulating fluidized bed system flue gases containing solids therein are produced; and
   separating the solids from the second bed system flue gases, and returning the separated solids to the second circulating bed system.

2. A method as recited in claim 1 comprising the further step of supplying a sulfur absorbing agent to the second circulating fluidizing bed system.

3. A method as recited in claim 2 comprising the further step of supplying an $NO_x$ formation decreasing agent to the second circulating bed system.

4. A method as recited in claim 3 comprising the further step of cooling the flue gases from the second bed system before effecting separation of solids therefrom.

5. A method as recited in claim 4 comprising the further step of cooling the flue gases from the first bed system before separating the solids therefrom.

6. A method as recited in claim 1 comprising the further step of supplying an $NO_x$ formation decreasing agent to the second circulating bed system.

7. A method as described in claim 1 comprising the further step of cooling the flue gases from the second bed system before effecting separation of solids therefrom.

8. A method as recited in claim 7 comprising the further step of cooling the flue gases from the first bed system before separating the solids therefrom.

9. A method as recited in claim 1 comprising the further step of cooling the flue gases from the first bed system before separating the solids therefrom.

10. A method as recited in claim 7 wherein the fuel introduced into the first bed system is coal, and comprising the further steps of controlling the combustion process in the first and second bed systems so that the temperature in the first bed system is within range of 700°–1000° C., and so that the temperature in the second bed system is in the range of 600°–950° C.

11. A method as recited in claim 9 wherein the fuel introduced into the first bed system is coal, and comprising the further steps of controlling the combustion process in the first and second bed systems so that the temperature in the first bed system is within range of 700°-1000° C., and so that the temperature in the second bed system is in the range of 600°-950° C.

12. A method as recited in claim 1 wherein the fuel introduced into the first bed system is coal, and comprising the further steps of controlling the combustion process in the first and second bed systems so that the temperature in the first bed system is within range of 700°-1000° C., and so that the temperature in the second bed system is in the range of 600°-950° C.

* * * * *